United States Patent [19]

Pate

[11] 4,209,932
[45] Jul. 1, 1980

[54] SPINNER BAIT FISHING LURE

[76] Inventor: Fred L. Pate, 3513 Talladega Hwy., Sylacauga, Ala. 35150

[21] Appl. No.: 911,757

[22] Filed: Jun. 2, 1978

[51] Int. Cl.² ............................................. A01K 85/00
[52] U.S. Cl. ................................... 43/42.11; 43/42.13
[58] Field of Search ................. 43/42.11, 42.12, 42.13, 43/42.14, 42.16, 42.18, 42.17, 42.19, 42.2, 42.49, 42.08

[56] References Cited

U.S. PATENT DOCUMENTS

| | | | |
|---|---|---|---|
| 1,854,024 | 4/1932 | Farley | 43/42.13 |
| 2,374,279 | 4/1945 | Fugler | 43/42.13 |
| 2,819,553 | 1/1958 | Fultz | 43/42.49 X |
| 3,040,466 | 6/1962 | Jablonski | 43/42.49 X |
| 3,093,923 | 6/1963 | Jackson | 43/42.11 |
| 3,546,804 | 12/1970 | Woolums | 43/42.11 |
| 4,003,154 | 1/1977 | Caruer | 43/42.13 |
| 4,011,681 | 3/1977 | Johnson | 43/42.11 |
| 4,133,135 | 1/1979 | Miles | 43/42.13 |

Primary Examiner—Nicholas P. Godici
Attorney, Agent, or Firm—Burns, Doane, Swecker & Mathis

[57] ABSTRACT

A fishing lure of the spinner bait type is connected to a fishing line by means of a device which permits the lure to rotate about an axis substantially perpendicular to the fishing line. The device includes a clevis or cylinder which is mounted on the lure near the intersection of two diverging arms of the lure. The device is mounted by means of a U-shaped connection member which permits free rotation of the device and fixes the device spatially with respect to the lure. The connection device is located on the lure at a position where the fishing line, when pulled taut, defines a line which passes through the center of mass of the lure to maintain the lure statically balanced as well as hydrodynamically balanced when the lure is pulled through the water.

9 Claims, 4 Drawing Figures

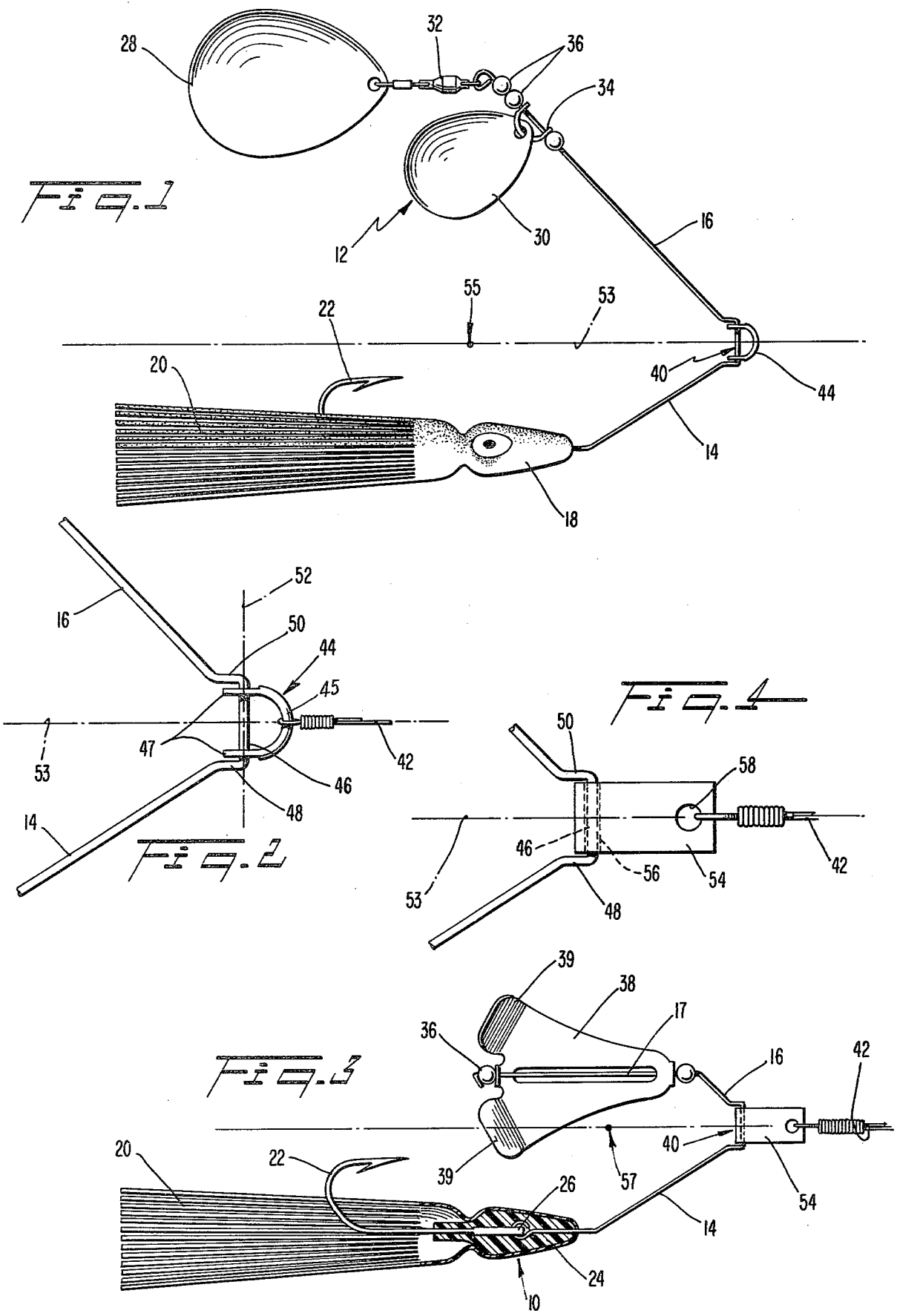

SPINNER BAIT FISHING LURE

BACKGROUND OF THE INVENTION

The present invention relates to fishing lures of the spinner bait type which include a body and hook portion resembling a small fish or animal and one or more spinner blades for attracting fish, and more particularly, it relates to the means for connecting such a lure to a fishing line.

Fishing lures of the type described generally comprise two diverging wire arm members for respectively connecting the body and the spinner blade to the fishing line. Generally, the two arms are formed by bending a wire at an angle of approximately 90°. In the past, the fishing line was connected to a wire eyelet located at the intersection of the two arms, i.e., the bend in the wire. Such a lure is disclosed in U.S. Pat. No. 3,996,688, issued to Hardwicke, III on Dec. 14, 1976.

In the past, the eyelet has been formed by one of two well-known methods. The wire can be bent a full 360° to form a loop therein and then bent an additional 90° to form the diverging arms. Alternatively, the wire is bent and a nipple is formed in the wire at the bend. Subsequently, the nipple is then twisted relative to the arms to close off the nipple and form the eyelet.

Spinner baits of this type are commonly used in waters which are congested with surface and underwater obstacles such as log jams, protruding trees, brush tops, grass beds, etc. It is quite common for the lure to strike one or more of these obstacles after being cast and before coming to rest. This causes the lure to be deflected and rotate generally about one of two axes; parallel to the attached line, or perpendicular to the attached line.

In a first type of movement, the lure rotates about an axis substantially coaxial with the fishing line. This causes a torsional twist in the line which can weaken the line and affect the subsequent movement of the lure through the water. This problem is generally alleviated by utilization of a swivel type of connector located between the line and the lure.

Of far more consequence, however, is rotation of the lure about an axis which is substantially perpendicular to the fishing line. When the lure makes one or more rotations of this type and the line is subsequently pulled taut to retrieve the lure, the line is pinched between adjacent portions of wire which have been twisted to form the eyelet. If a fish should then strike the lure and force is applied to set the hook, the line will be severed at the point where it is pinched, or at least severely damaged and weakened. The fish and lure will consequently be lost at this point or during a subsequent cast.

One proposed solution to this problem is disclosed by U.S. Pat. No. 3,546,804, issued to Woolums on Dec. 18, 1970. In this patent, a nipple which is open towards the rear of the lure is used as the device for connecting the lure to the line. The nipple permits the line attached thereto to rotate freely with respect to the lure without pinching the line between adjacent twisted portions of wire.

The open nipple design presents other problems, however. Since the nipple is open at the rear, the snap swivel type of connector commonly used to prevent line twist cannot be employed: the connector would be free to slide along the entire length of the wire, i.e., along either arm, and would not retain the fishing line substantially coaxial with the center line of the lure permitting imbalances to occur. This can result in the lure being dragged through the water in a position which inhibits the desired motion of the lure, and hence negates its effectiveness.

As a result, the fishing line must be directly tied to the nipple with some degree of precision. The knot must be tight enough to prevent the line from sliding along the wire and yet loose enough to permit 360° rotation around the wire. In any event, the rotation of the line around the wire will wear the line and weaken it after a period of time. Furthermore, any scratches, nicks or other roughness on the nipple will act as a cutting surface which will damage the line as it rotates.

In addition, direct connection of the line to the lure limits the motion of the lure essential to enticing the fish. In the types of situations in which spinner baits are normally used, a relatively heavy line, e.g., 17-25 pound test, is employed. Such line has a relatively small amount of flexibility due to its diameter. Hence, when the line is directly tied to the lure rather than by means of a swivel or other freely moveable connector, the oscillatory motion of the lure is dampened.

As a further proposed solution, spacer beads are placed on the wire on either side of the connection of the fishing line to the lure. The wire is then bent to form an open nipple which includes the beads, and if the bends in the wire are substantial enough, the beads are prevented from sliding along the arms of the lure.

Such a design does not prevent the fishing line from sliding along the axis of rotation within the confines of the nipple, however. When the fishing line is free to move like this, the point of connection of the fishing line does not continue to define a line which passes through the center of mass of the lure. Furthermore, the hydrodynamic forces on either side of the fishing line are not maintained equal, causing the lure to be pulled through the water in an unbalanced state and not remain as as effective for attracting the fish.

OBJECTS AND BRIEF SUMMARY OF THE INVENTION

Accordingly, it is an object of the present invention to provide a novel fishing lure which does not result in pinching of a fishing line when the lure rotates.

It is another object of the present invention to provide a novel fishing lure which does not require direct connection of a fishing line to the lure, to reduce wear on the line and to permit conventional connectors to be used.

It is a further object of the present invention to provide a novel fishing lure which allows the lure to move about in the water with a maximum amount of motion regardless of the size of the line used.

It is yet another object of the present invention to provide a novel fishing lure which fixes the point of attachment of the fishing line so that the fishing line defines a line passing through the center of mass of the lure when pulled taut to maintain the lure statically and hydrodynamically force balanced.

These and other objects of the present invention are achieved by connecting the lure to the fishing line with a device which freely rotates about an axis substantially perpendicular to the fishing line. The device is spatially fixed along the axis so that it is inhibited from sliding along the arms of the lures to fix the point of attachment of the fishing line so that it defines a line which passes through the center of mass of the lure. Preferably, the device comprises a clevis or cylinder attached to the lure at a U-shaped bend in a wire used to form the arms of the lure.

By rotating freely about the axis, the device permits relative rotation between the line and the lure without pinching the line. Since the device rather than the line rotates relative to the lure, wear on the line is substantially reduced and conventional connectors can be used. The free movement of the device and the use of conventional connectors provides for maximum oscillatory motion of the line as it travels through the water.

BRIEF DESCRIPTION OF THE DRAWINGS

FIG. 1 is a side elevational view of a lure which embodies the present invention;

FIG. 2 is an enlarged view of the connecting device of the embodiment illustrated in FIG. 1;

FIG. 3 is a side view in elevation of a second embodiment of the present invention with a sectional illustration of the body portion of the fishing lure;

FIG. 4 is an enlarged view of the connecting device of the embodiment illustrated in FIG. 3.

DETAILED DESCRIPTION OF THE PREFERRED EMBODIMENT

A fishing line of the spinner bait type is illustrated in FIG. 1. Such a lure generally comprises two main portions, a body portion 10 and a spinner portion 12. The body portion 10 provides the weight necessary to properly cast the lure and simulates the prey of the game fish. The spinner portion 12 produces noise to attract the fish and causes the lure to vibrate to make the lure appear to be alive and swimming.

To fix the position of the portions 10, 12 relative to each other, the body portion 10 and the spinner portion 12 are mounted, respectively, on a pair of diverging arms 14, 16. The arms 14, 16 are made of wire and are formed by bending a single piece of wire, preferably so that the arms 14, 16 are substantially at a right angle with respect to each other. One example of wire which is suitable for use in constructing fishing lures of this type is spring stainless steel wire having a diameter of about 0.040 inch.

The body portion 10 of the spinner bait includes a body comprising a head 18 and a tail 20 which resembles a small fish or other prey of the game fish. A hook 22 is also included in the body portion 10. When the lure is pulled through the water, the tail 20 substantially covers the hook 22 to conceal it from the fish.

Preferably, the head 18 and the tail 20 of the body are molded from a single piece of soft vinyl or other suitable flexible material. Such a body is illustrated in more detail in FIG. 3.

Referring now to FIG. 3, the body portion 10 of the lure includes a sinker 24 which is preferably made of lead. The hook 22 and the arm 14 are connected by means of interlocking loops 26. Subsequently, the sinker 24 is formed around the connection of the arm 14 and the hook 22 to fix the hook in place.

The head 18 of the body comprises a hollow sleeve of vinyl or the like which is fitted over the hook 22 and pulled over the sinker 24 into the position illustrated. A slit skirt which is integral with the hollow sleeve forming the head 18 comprises the tail 20. The head 18 and tail 20 of the body can be molded into any suitable shape and colored in a fashion which resembles a prey of the game fish. One-piece vinyl construction is preferable since it has the colors integrally molded therein rather than being painted, which is subject to chipping and hence loss of attractiveness to the fish.

It will be obvious to those of ordinary skill that other types of body portions 10 are suitable for use on a spinner bait embodying the present invention. For example, the sinker 24 can be shaped and painted to resemble a head, and the tail can be made of a slit skirt or plurality of streamers which are attached to the sinker 24.

Referring again to FIG. 1, the spinner portion 12 of the lure includes a pair of spinner blades 28, 30. These blades are preferably made of metal with a reflective surface and have a slightly convex shape to create turbulence and impart motion thereto as they are pulled through the water. One blade 28 is connected to the end of the arm 16 by means of a swivel connector 32 to permit free movement of the blade 28 in all directions. The second spinner blade 30 is connected to the arm 16 by means of a clevis 34 which permits the spinner blade 30 to rotate about the arm 16. Spacer beads 36 are preferably inserted between the clevis 34 and the point of connection of the swivel connector 32 to the arm 16 to provide suitable spacing between the two spinner blades 28, 30.

An alternative embodiment of the spinner portion 12 is illustrated in FIG. 3. In this embodiment, the spinner blade 38 is mounted along and rotatable about an axis defined by the arm 16. The arm 16 is bent so as to form a portion 17 which extends parallel to the fishing line 42 and hence parallel to the direction of movement of the lure. The spinner blade 38 is formed as a pair of coplanar wings. To provide a rotational force, the wings have a slight angular pitch 39 imparted thereto so that the blade 38 will encounter resistance and rotate as the lure is pulled through the water. Other types of spinner blade designs which create noise and impart motion to the lure as it is pulled through the water will be obvious to those skilled in the art.

Referring again to FIGS. 1 and 2, the lure includes a connection means 40 for facilitating attachment of the lure to a fishing line 42. In the embodiment of FIGS. 1 and 2, the connection means 40 comprises a clevis 44 which provides a rotatable connection between the fishing line 42 and the arms 14, 16 of the lure.

As shown in detail in FIG. 2, the arms 14, 16 of the lure are preferably disposed at a right angle with respect to each other. Near the point of their intersection, the wire is bent to form a U-shaped member comprised of a base 46 and legs 48, 50 which are substantially perpendicular to the base. Each of the legs 48, 50 are respectively connected to one of the arms 14, 16 at the open end of the U-shaped member, and are integral with the arms 14, 16.

The clevis 44 includes an arcuate middle portion 45 and two substantially parallel legs 47. An aperture is present in each of the legs 47, and the apertures are in axial alignment so that the base 46 of the U-shaped portion can be inserted therethrough.

After insertion through the apertures in the legs 47 of the clevis 44, the wire is bent to form the legs 48, 50 adjacent to the legs 47 of the clevis 44. The legs 47 are formed to be as close as possible to the legs 48, 50 yet sufficient space is provided between them to permit the clevis 44 to rotate freely about the base 46. To form the diverging arms 14, 16, the wire is then splayed until the appropriate amount of divergence is obtained.

It is preferable that the legs 48, 50 of the U-shaped member be substantially parallel to each other and perpendicular to the base 46. However, it will be obvious to those of ordinary skill that any angle between the base 46 and the legs 48, 50 which is sufficient to prevent the clevis 44 from sliding along the wire will perform the necessary function. For example, the legs 48, 50 need only be bent at a 45° angle with respect to the base 46, in which case they would be coaxial with the arms 14, 16.

The base 46 of the U-shaped member constitutes an intermediate arm disposed between the two diverging arms 14, 16. The clevis 44 is attached to the intermediate arm 46 at the open end of the clevis. The intermediate arm 46 defines an axis 52 about which the clevis 44 freely rotates. The length of the base 46 between the legs 48, 50 is only slightly larger than the outside of the clevis 44 so that the legs 48, 50 of the U-shaped member spatially fix the position of the clevis 44 with respect to the base 46 to inhibit it from sliding along the arms 14, 16 and interfering with the efficient operation of the lure. For example, the clevis 44 may have an outside width of 9/32 inch along its line of connection to the U-shaped member and the legs 48, 50 may be spaced 5/16 inch apart to retain the clevis in its axial position.

The fishing line 42 is connected to the clevis 44 at the arcuate portion thereof. Alternatively, the fishing line can be fastened to a swivel connector or other suitable conventional connector which is attachable to the clevis 44. This eliminates the need for a smooth finish on the clevis 44 and provides relief from line twist.

Since the line 42 is attached to the arcuate portion of the clevis 44, it tends to remain at the center of the clevis 44 when pulled taut because this is the forwardmost point on the lure. Furthermore, since the clevis 44 is fixed along the axis 52 with respect to the lure, the point of connection of the fishing line to the lure remains on a line 53 which passes through the center of mass 55 of the lure to maintain the lure statically balanced (FIG. 1). When the arms 14, 16 are formed, they are bent so that the center of mass 55 of the lure lies on the line 53 which passes through the center of the connection means 40, and hence, through the point of connection of the fishing line 42 to the lure.

In addition to the center of mass, the hydrodynamic forces which are present on the lure when it is pulled through the water are taken into account. The connection means 40 is located at a position where the hydrodynamic forces on either side of the fishing line will be equal. This involves a consideration of the external shape of each of the body portion 10 and the spinner portion 12, the length of the arms 14, 16 and the amount of divergence of the arms 14, 16. By proper placement of the body portion 10 and the spinner portion 12 relative to each other and to the connection means 40 to assure static and hydrodynamic force balance, the lure will be balanced as it is pulled through the water and hence exhibit maximum effectiveness for enticing fish.

An alternative embodiment of the connection means 40 is illustrated in FIGS. 3 and 4. In this embodiment, the clevis 44 is replaced with a cylinder 54 having a width substantially the same as the direction between the legs 48, 50. The cylinder has a bore 56 passing therethrough at one end for accomodating the base 46 of the U-shaped member. A bore 58 is located at the other end of the cylinder 54 which is of a suitable size to adapt the cylinder for connection to a fishing line 42, swivel connector, or the like. The bore 58 may have an axis which is transverse to that of the bore 56 (as shown), parallel thereto, or in any other position which best accomodates attachment to the line 42. The cylinder 54 may have a cross section which is square, circular or any other suitable shape.

The arms 14, 16 of the embodiment of the lure illustrated in FIGS. 3 and 4 are modified from those of the embodiment in FIG. 1. The lower arm 14 is coaxial with the leg 48 of the U-shaped member and parallel to the direction of movement of the lure. To obtain adequate spacing between the body portion 10 and the spinner portion 12, to fix the center of mass 57 and balance the hydrodynamic forces with respect to the point of attachment of the line 42, the arm 16 diverges from the connection means 40 by an appropriate amount and is then bent to form a portion 17 which is parallel to the direction of movement of the lure. Other suitable designs for the relationship between the arms 14, 16 and the connection means 40 which provide for balanced and effective movement of the lure through the water will be obvious to those of ordinary skill in the art.

From the preceding description it will be appreciated that the present invention provides a novel means for connecting a spinner bait fishing lure to a fishing line. The connection means permits the lure to freely rotate about an axis substantially perpendicular to the line without pinching the line and without allowing the point of connection between the line and the lure to move along the arms of the lure. The point of attachment of the fishing line is fixed on a line passing through the center of mass of the lure to maintain the lure statically balanced, and hydrodynamically balanced as it is pulled through the water. Furthermore, the connection means enables the use of conventional connectors in attaching the lure to the line, reducing wear on the line and permitting maximum freedom of movement of the lure.

It will be obvious to those of ordinary skill in the art that other embodiments of a rotatable connection means come within the spirit of the present invention. For example, a strip of metal which is looped around the base of the U-shaped member in fixed relation to the lure and connected to a fishing line contains the essential characteristics of the invention. The presently disclosed embodiments are therefore to be considered in all respects as illustrative and not restrictive. The scope of the invention is defined by the appended claims rather than the foregoing description, and all changes which come within the meaning and range of equivalency of the claims are expressly intended to be embraced therein.

What is claimed is:

1. In a fishing lure of the type including a pair of diverging arms, a hook connected to one of said arms, spinner means connected to the other of said arms and means for connection to a fishing line located near the intersection of said diverging arms, the improvement wherein:

said connection means includes rotatable means comprising a clevis for connecting a fishing line to said pair of arms, said rotatable means being freely rotatable a full 360° relative to said arms about an axis substantially perpendicular to the fishing line and further wherein said rotatable means is spatially fixed with respect to the lure to fix the point of attachment of the fishing line to the lure so that the fishing line defines a line which passes through the center of mass of the lure and the hydrodynamic forces on either side of said defined line are balanced when the fishing line is pulled taut.

2. The fishing lure of claim 1 wherein said connection means further includes an intermediate arm disposed between said pair of diverging arms and defining said axis, further wherein said rotatable means is connected to said intermediate arm so as to be freely rotatable about said intermediate arm.

3. The fishing lure of claim 1 wherein said spinner means includes a first spinner blade attached to the end of said other arm by a swivel connector.

4. The fishing lure of claim 3 wherein said spinner means further includes a second spinner blade connected to said other arm by a clevis so as to be rotatable about said other arm.

5. The fishing lure of claim 1 wherein said spinner means includes a winged spinner blade mounted on said other arm and rotatable about an axis defined by said other arm.

6. A fishing lure comprising:

first and second diverging arms disposed at substantially a right angle with respect to each other;

spinner blade means connected to said first arm and rotatable relative to said first arm;

sinker means and a hook connected to an end of said second arm;

a plurality of trailing appendages connected to said end of said second arm and adapted to substantially cover said hook when the fishing lure is moved through water;

a U-shaped connection member for connecting said first and second arms at their respective ends near their point of intersection, the legs of said connection member being respectively connected to and integral with said respective ends of said arms at the open end of the U-shaped member; and a clevis mounted on the base of said U-shaped member so as to be rotatable about said base and adapted to be connected to a fishing line, said clevis having a width substantially the same as the distance between said legs to inhibit said clevis from substantially sliding along said base.

7. In a fishing lure of the type including a pair of diverging arms, a hook connected to one of said arms, spinner means connected to the other of said arms and means for connection to a fishing line located near the intersection of said diverging arms, the improvement wherein:

said connection means includes an intermediate arm disposed between said pair of diverging arms and defining an axis substantially perpendicular to the fishing line, and a rotatable means comprising a clevis which is attached at the open end thereof to said intermediate arm for connecting a fishing line to said pair of arms, said rotatable means being freely rotatable relative to said arms about said axis, further wherein said rotatable means is spatially fixed with respect to the lure to fix the point of attachment of the fishing line to the lure so that the fishing line defines a line which passes through the center of mass of the lure and the hydrodynamic forces on either side of said defined line are balanced when the fishing line is pulled taut.

8. In a fishing lure of the type including a pair of diverging arms, a hook connected to one of said arms, spinner means connected to the other of said arms and means for connection to a fishing line located near the intersection of said diverging arms, the improvement wherein:

said connection means includes an intermediate arm disposed between said pair of diverging arms and defining an axis substantially perpendicular to the fishing line, and a rotatable means comprising a cylinder having a bore through one end thereof which accommodates said intermediate arm, the other end of said cylinder being adapted for connection to the fishing line, said rotatable means being freely rotatable relative to said arms about said axis, further wherein said rotatable means is spatially fixed with respect to the lure to fix the point of attachment of the fishing line to the lure so that the fishing line defines a line which passes through the center of mass of the lure and the hydrodynamic forces on either side of said defined line are balanced when the fishing line is pulled taut.

9. A fishing lure comprising:

first and second spaced apart, diverging arms;

spinner blade means connected to said first arm and rotatable relative to said first arm;

sinker means and a hook connected to one end of said second arm;

a plurality of trailing appendages connected to said end of said second arm and adapted to substantially cover said hook when the fishing lure is moved through water;

a U-shaped connection member for connecting said first and second arms at their respective ends near their point of intersection, the legs of said connection member being respectively connected to and integral with said respective ends of said arms at the open end of the U-shaped member; and a clevis mounted on the base of said U-shaped member so as to be rotatable about said base and adapted to be connected to a fishing line, said clevis having a width substantially the same as the distance between said legs to inhibit said clevis from substantially sliding along said base.

* * * * *